United States Patent
Mainini et al.

(10) Patent No.: US 9,615,542 B2
(45) Date of Patent: Apr. 11, 2017

(54) MECHANICALLY COMPLIANT PROBE FOR DELIVERING AN ELECTRICAL STIMULUS TO AN ANIMAL

(75) Inventors: Christopher E. Mainini, Knoxville, TN (US); Clifton P. Brick, Oak Ridge, TN (US)

(73) Assignee: Radio Systems Corporation, Knoxville, TN (US)

( * ) Notice: Subject to any disclaimer, the term of this patent is extended or adjusted under 35 U.S.C. 154(b) by 1758 days.

(21) Appl. No.: 12/712,749

(22) Filed: Feb. 25, 2010

(65) Prior Publication Data
US 2011/0203529 A1    Aug. 25, 2011

(51) Int. Cl.
*A01K 27/00*    (2006.01)
*A01K 15/02*    (2006.01)

(52) U.S. Cl.
CPC ............ *A01K 15/02* (2013.01); *A01K 27/009* (2013.01)

(58) Field of Classification Search
CPC ...... A01K 15/00; A01K 15/02; A01K 15/022; A01K 15/201; A01K 15/029; A01K 27/009; A01K 29/00; A01K 29/005
USPC ................... 119/718–721, 585, 859
See application file for complete search history.

(56) References Cited

U.S. PATENT DOCUMENTS

| | | | |
|---|---|---|---|
| 4,180,013 A * | 12/1979 | Smith ......................... | 119/718 |
| 5,460,124 A | 10/1995 | Grimsley et al. | |
| 5,533,469 A * | 7/1996 | Touchton et al. ............. | 119/721 |
| 6,830,012 B1 | 12/2004 | Swan | |
| 6,830,013 B2 * | 12/2004 | Williams ...................... | 119/765 |
| 6,907,844 B1 | 6/2005 | Crist | |
| 7,503,285 B2 * | 3/2009 | Mainini ............... | A01K 15/021 |
| | | | 119/719 |
| 2001/0042522 A1 * | 11/2001 | Barry et al. ................... | 119/721 |
| 2006/0130775 A1 | 6/2006 | Rautenbach | |
| 2007/0186871 A1 | 8/2007 | Boyd | |
| 2008/0156278 A1 | 7/2008 | Mainini et al. | |
| 2008/0163829 A1 * | 7/2008 | Lee et al. ...................... | 119/718 |

* cited by examiner

*Primary Examiner* — Thien Thanh Pham
(74) *Attorney, Agent, or Firm* — Pitts & Lake, P.C.

(57) ABSTRACT

Described is a mechanically compliant stimulus delivery probe for delivering an electrical stimulus to an animal. The stimulus delivery probe is mechanically secured to an animal training device that is adapted to be carried by the animal and to generate the electrical stimulus. When the animal training device is carried by the animal, the stimulus delivery probe is positioned in physical contact with the animal such that the stimulus delivery probe delivers the electrical stimulus to the animal. The stimulus delivery probe is also mechanically compliant to the extent that the force applied by the animal training device against the stimulus delivery probe is substantially absorbed by the stimulus delivery probe, reducing the localized force realized by the animal. The reduction of the force realized by the animal promotes safety and comfort for the animal.

22 Claims, 2 Drawing Sheets

MECHANICALLY COMPLIANT PROBE FOR DELIVERING AN ELECTRICAL STIMULUS TO AN ANIMAL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention pertains to a device for delivering a stimulus to an animal. More particularly, this invention pertains to a device for delivering an electrical stimulus to an animal and for being comfortably worn by the animal.

2. Description of the Related Art

Many conventional animal training systems include stimulus delivery probes for being secured against the skin of a pet and for delivering an electrical stimulus to the pet. One type of conventional probe is constructed of stainless steel. Stainless steel probes are highly conductive and highly effective in delivering an electrical stimulus to the pet. Additionally, stainless steel probes are non-allergenic and easily cleaned. However, stainless steel probes are limited in that the rigidity of the probes creates a degree a discomfort for the pet and, in circumstances of extended use, presents the risk of pressure necrosis at the contact point on the pet's skin.

Another type of conventional probe includes a pliable covering disposed about the rigid tip of the probe. The covering is an electrically conductive elastomer and is disposed about the portion of the probe secured against the pet's skin. The pliable covering is designed to provide a degree comfort for the pet and to permit an electrical stimulus to be delivered to the pet. One example of this type of conventional probe is discussed in U.S. Pat. No. 5,460,124, Grimsley et al. Although this type of conventional probe may provide improved comfort over the stainless steel probe, it is limited in that the pliable covering reduces the efficacy of the probe and deposits a potentially allergenic elastomer residue on the skin of the pet. Additionally, because the pliable covering is electrically conductive, this type of conventional probe is prone to shunting, especially when the fur of the pet is moist. Even more, in the event the pliable covering breaks from the probe, the exposed portion of the probe presents a safety risk for the pet. Consequently, a stimulus delivery probe that delivers an electrical stimulus with the efficacy of a stainless steel probe and with the comfort of a probe having a pliable covering is desired.

BRIEF SUMMARY OF THE INVENTION

In accordance with the various features of the present invention there is provided a mechanically compliant stimulus delivery probe for delivering an electrical stimulus to an animal. The stimulus delivery probe is adapted to be mechanically secured to an animal training device, which is adapted to be carried by the animal and to generate the electrical stimulus. The stimulus delivery probe includes a compliant member and a tip member. The compliant member is electrically conductive and in electrical communication with the animal training device. The compliant member is also mechanically compliant to a force applied to the stimulus delivery probe by the animal training device when the animal training device is carried by the animal. This mechanical compliance provides comfort and reduces the risk of harm to the animal. The tip member is also electrically conductive and is mechanically secured to the compliant member such that the tip member is in electrical communication with the compliant member. When the animal training device is carried by the animal, the tip member is positioned in physical contact with the animal such that the tip member delivers the electrical stimulus to the animal when the animal training device generates the electrical stimulus.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
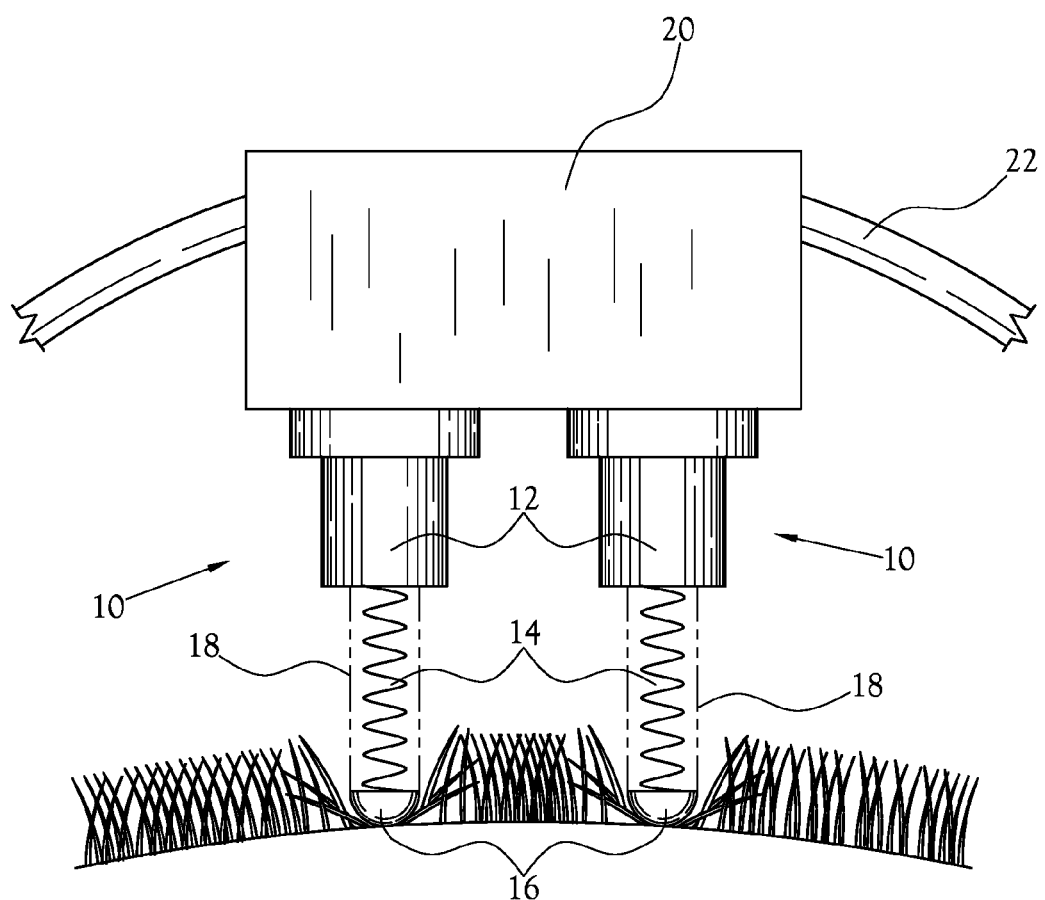
FIG. 1 illustrates one embodiment of the stimulus delivery probe in accordance with the various features of the present invention.

The present invention provides a mechanically compliant stimulus delivery probe for delivering an electrical stimulus to an animal. The stimulus delivery probe is mechanically secured to an animal training device that is adapted to be carried by the animal and to generate the electrical stimulus. When the animal training device is carried by the animal, the stimulus delivery probe is positioned in physical contact with the animal such that the stimulus delivery probe delivers the electrical stimulus to the animal when the animal training device generates the electrical stimulus. The stimulus delivery probe is also mechanically compliant to the extent that the force applied by the animal training device against the stimulus delivery probe is substantially absorbed by the stimulus delivery probe, the force otherwise being transferred to the animal. As a result, the stimulus delivery probe reduces the localized force realized by the animal. The reduction of the force realized by the animal promotes safety and comfort for the animal. One embodiment of the stimulus delivery probe constructed in accordance with the various features of the present invention is illustrated generally at 10 in FIG. 1.

The stimulus delivery probe 10 includes a base member 12, a compliant member 14, a tip member 16, and a compliant member covering 18. The base member 12 is adapted to be mechanically secured to the animal training device 20. In one embodiment, the base member 12 is removably secured to the animal training device 20, such as by way of cooperating threaded portions. In another embodiment, the base member 12 is permanently secured to the animal training device 20. The base member 12 is also mechanically secured to the compliant member 14, which is in electrical communication with the animal training device 20 when the base member 12 is secured to the animal training device 20. It should be noted that the complaint member 14 can be mechanically secured to the animal training device 20 directly, thus eliminating the need for the base member 12, without departing from the scope or spirit of the present invention.

The compliant member 14 is mechanically compliant in accordance with subsequent discussion. Additionally, the compliant member 14 is electrically conductive to the extent that it transfers the electrical stimulus generated by the animal training device 20. For example, in one embodiment, the compliant member 14 is constructed of a metallic material. The compliant member 14 is mechanically secured to and in electrical communication with the tip member 16. The tip member 16 is constructed of an electrically conductive material, such as stainless steel, and is contoured to be positioned in comfortable physical contact with the animal's skin 24. In the illustrated embodiment, the tip member 16 has a rounded contour.

When the animal training device 20 is carried by the animal, the tip member 16 is positioned in physical contact with the animal. More specifically, the tip member 16 is positioned in physical contact with the animal's skin 24. In the illustrated embodiment, two stimulus delivery probes 10 are secured to the animal training device 20 such that the electrical stimulus can be delivered to the animal by way of the stimulus delivery probes 10. It should be noted that a single stimulus delivery probe 10, used in combination with a conventional-type probe, can be used to deliver the electrical stimulus to the animal without departing from the scope or spirit of the present invention.

Figure 2:
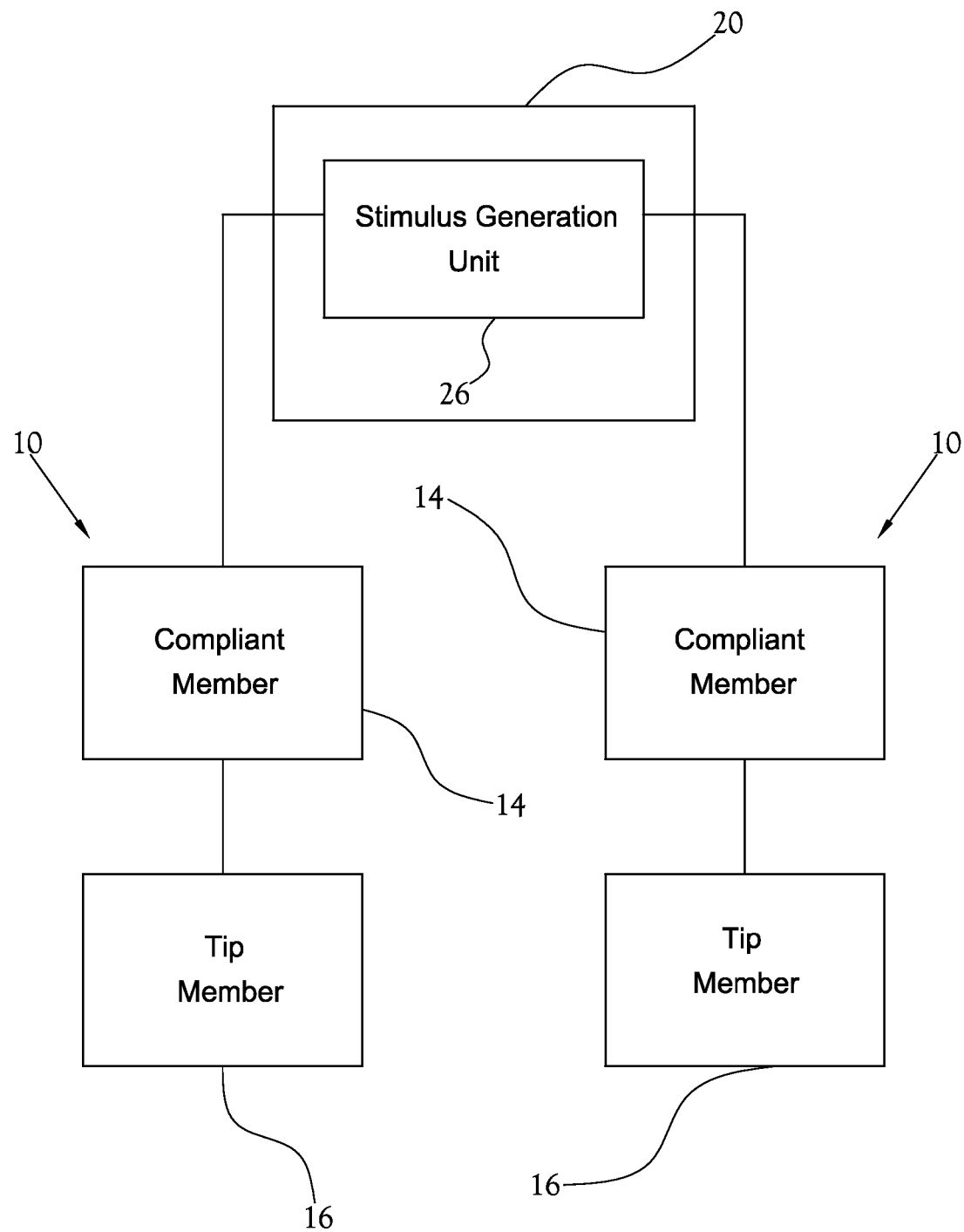
FIG. 2 is a block diagram illustrating the electrical relationship among various components of the stimulus delivery probe.

FIG. 2 is a block diagram of one embodiment of the stimulus delivery probe 10 illustrating the electrical components of the probe 10 and their relationship to the animal training device 20. The animal training device 20 includes a stimulus generation unit 26 for generating the electrical stimulus. The stimulus generation unit 26 is in electrical communication with the compliant member 14, which is in electrical communication with the tip member 16. Additionally, as discussed above, when the animal training device 20 is carried by the animal, the tip member 16 is in physical contact with the animal. Consequently, when the stimulus generation unit 26 generates the electrical stimulus, the electrical stimulus is transferred by the compliant member 14 to the tip member 16, which delivers the electrical stimulus to the animal. Considering the above discussion, the stimulus delivery probe 10 is capable of effectively delivering an electrical stimulus to the animal because the highly conductive tip member 16 is in electrical communication with the animal training device 20 by way of the highly conductive compliant member 14. Stated differently, the efficacy of the stimulus delivery probe 10 is not retarded by any insulative or partially insulative material, such as a conductive elastomer coating on the tip member 16. Additionally, because the tip member 16 is constructed of a material such as stainless steel, it does not present the potential for allergenic reaction and is easily cleaned.

Considering again the illustrated embodiment of FIG. 1, the animal training device 20 is secured to an animal collar 22 such that when the animal collar is worn by the animal, the stimulus delivery probe 10 is in physical contact with the animal. To maintain the physical contact between the stimulus delivery probe 10 and the animal, the collar 22 causes the animal training device 20 to apply a force against the stimulus delivery probe 10. More specifically, in the illustrated embodiment, the animal training device 20 applies a force against the base member 12 such that the tip member 16 is held in physical contact with the animal. Naturally, the force applied against the stimulus delivery probe 10 is transferred to the animal. As discussed above, conventional probes are rigid and transfer the entire force to the animal, presenting discomfort and a safety risk for the animal. However, the compliant member 14 absorbs this force to the extent that the force realized by the animal is substantially reduced. More specifically, the compliant member 14 is mechanically compliant in that it is resiliently compressible in the direction of the force. Stated differently, the compliant member 14 is resiliently compressible between the animal training device 20 and the animal. In the illustrated embodiment, the complaint member 14 is a mechanical spring constructed of an electrically conductive material and having a longitudinal axis parallel to the direction of the force applied by the animal training device 20. However, it should be noted that the compliant member 14 can be a structure other than a mechanical spring, such as a conductive elastomer, without departing from the scope or spirit of the present invention. Considering the above discussion, the stimulus delivery probe 10 provides for a safe and comfortable device for efficiently and effectively delivering an electrical stimulus to the animal.

The compliant member covering 18 substantially encloses the compliant member 14 such that the compliant member 14 is not exposed to the environment exterior to the stimulus delivery probe 10. The compliant member covering 18 prevents environmental elements from interfering with the delivery of the electrical stimulus and prevents the otherwise exposed compliant member 14 from mechanically or electrically harming the animal. The compliant member covering 18 is flexible to the extent that it does not restrict the mechanical compliance provided by the compliant member 14. Additionally, in one embodiment, the compliance member covering 18 is electrically insulative such that the compliant member covering 18 prevents electrical shunting between two stimulus delivery probes 10, such shunting reducing the effectiveness of the probes 10.

From the foregoing description, those skilled in the art will recognize that a stimulus delivery probe for delivering an electrical stimulus to an animal providing advantages over the prior art has been provided. The stimulus delivery probe is mechanically secured to an animal training device that is adapted to be carried by the animal and to generate the electrical stimulus. When the animal training device is carried by the animal, the stimulus delivery probe is positioned in physical contact with the animal such that the stimulus delivery probe delivers the electrical stimulus to the animal when the animal training device generates the electrical stimulus. The stimulus delivery probe is also mechanically compliant to the extent that the force applied by the animal training device against the stimulus delivery probe is substantially absorbed by the stimulus delivery probe, the force otherwise being transferred to the animal. As a result, the stimulus delivery probe reduces the localized force realized by the animal. The reduction of the force realized by the animal promotes safety and comfort for the animal.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A stimulus delivery probe adapted to be mechanically secured to an animal training device and adapted to deliver an electrical stimulus to an animal, said stimulus delivery probe comprising:
   a compliant member in electrical communication with the animal training device when said stimulus delivery probe is mechanically secured to the animal training device, the animal training device being adapted to be carried by the animal and to generate the electrical stimulus, said compliant member being electrically conductive to the extent that said compliant member is capable of transferring the electrical stimulus, said compliant member being mechanically compliant to a force applied against said stimulus delivery probe between the animal training device and the animal when the animal training device is carried by the animal;
   a tip member mechanically secured to said compliant member such that said tip member is positioned in physical contact with the animal when the animal training device is carried by the animal, said tip member being electrically conductive and in electrical communication with said compliant member such that said tip member delivers the electrical stimulus to the animal when the animal training system generates the electrical stimulus; and
   a compliant member covering disposed about said compliant member, said compliant member covering being electrically insulative and flexible to the extent that it does not restrict the mechanical compliance of said compliant member.

2. The stimulus delivery probe of claim 1 wherein said compliant member covering encloses said compliant member such that said compliant member is not exposed to environmental elements exterior to said stimulus delivery probe.

3. The stimulus delivery probe of claim 1 wherein said compliant member covering is constructed of an elastomer.

4. The stimulus delivery probe of claim 1 wherein said compliant member is at least partially constructed of a metallic material.

5. The stimulus delivery probe of claim 1 wherein said compliant member includes a mechanical spring.

6. The stimulus delivery probe of claim 1 wherein said compliant member includes a conductive elastomer.

7. The stimulus delivery probe of claim 1 wherein said compliant member is mechanically secured to the animal training device.

8. The stimulus delivery probe of claim 1 further comprising a base member adapted to be mechanically secured to the animal training device, said compliant member being mechanically secured to said base member.

9. The stimulus delivery probe of claim 8 wherein said base member is adapted to be removably secured to the animal training device.

10. The stimulus delivery probe of claim 1 wherein said tip member is constructed of stainless steel.

11. A stimulus delivery probe for delivering an electrical stimulus to an animal, said stimulus delivery probe comprising:
    a base member adapted to be mechanically secured to an animal training device, the animal training device being adapted to be carried by the animal and capable of generating the electrical stimulus;
    a compliant member mechanically secured to said base member, said compliant member being in electrical communication with the animal training device when said base member is mechanically secured to the animal training device, said compliant member being electrically conductive and mechanically compliant to a force between the base member and the animal; and
    a tip member mechanically secured to and in electrical communication with said compliant member, said tip member being positioned in physical contact with the animal when the animal training device is carried by the animal, said tip member delivering the electrical stimulus to the animal when the animal training system generates the electrical stimulus a compliant member covering disposed about said compliant member, said compliant member covering being electrically insulative and flexible to the extent that it does not restrict the mechanical compliance of said compliant member.

12. The stimulus delivery probe of claim 11 wherein said base member is adapted to be removably secured to the animal training device.

13. The stimulus delivery probe of claim 11 wherein said compliant member is mechanically compliant in response to a force applied against said stimulus delivery probe by the animal training device when the animal training device is carried by the animal.

14. The stimulus delivery probe of claim 11 wherein said compliant member is longitudinally compressible.

15. The stimulus delivery probe of claim 11 wherein said compliant member substantially absorbs the force applied by the animal training system against said stimulus delivery probe such that the force, as realized by the animal, is reduced.

16. The stimulus delivery probe of claim 11 wherein said compliant member is at least partially constructed of a metallic material.

17. The stimulus delivery probe of claim 11 wherein said compliant member includes a mechanical spring.

18. The stimulus delivery probe of claim 11 wherein said tip member is constructed of stainless steel.

19. An animal training system for delivering an electrical stimulus to an animal, said animal training system comprising:
    a housing adapted to be carried by the animal;
    a stimulus generation unit disposed within said housing, said stimulus generation unit being adapted to generate the electrical stimulus;
    at least one stimulus delivery probe comprising:
    a base member adapted to be mechanically secured to said housing,
    a compliant member mechanically secured to said base member, said compliant member being electrically conductive and in electrical communication with said stimulus generation unit when said base member is secured to said housing, said compliant member being mechanically compliant in response to a force applied against said stimulus delivery probe between said animal training system and said animal when said animal training system is carried by the animal;
    a compliant member covering disposed about said compliant member, said compliant member covering being flexible to the extent that said compliant member covering does not restrict the mechanical compliance of said compliant member; and
    a tip member mechanically secured to said compliant member, said tip member being electrically conductive and in electrical communication with said compliant member, said tip member being positioned in physical contact with the animal when said animal training device is carried by the animal, said tip member delivers the electrical stimulus to the animal when said stimulus generation unit generates the electrical stimulus.

20. The stimulus delivery probe of claim 19 wherein said compliant member is longitudinally compressible.

21. The stimulus delivery probe of claim 19 wherein said compliant member includes a mechanical spring.

22. The stimulus delivery probe of claim 19 wherein said compliant member includes a conductive elastomer.

* * * * *